July 12, 1927.
D. C. SOWELL
1,635,444
LIQUID BATTERY FILLING DEVICE
Filed June 12, 1926
2 Sheets-Sheet 1
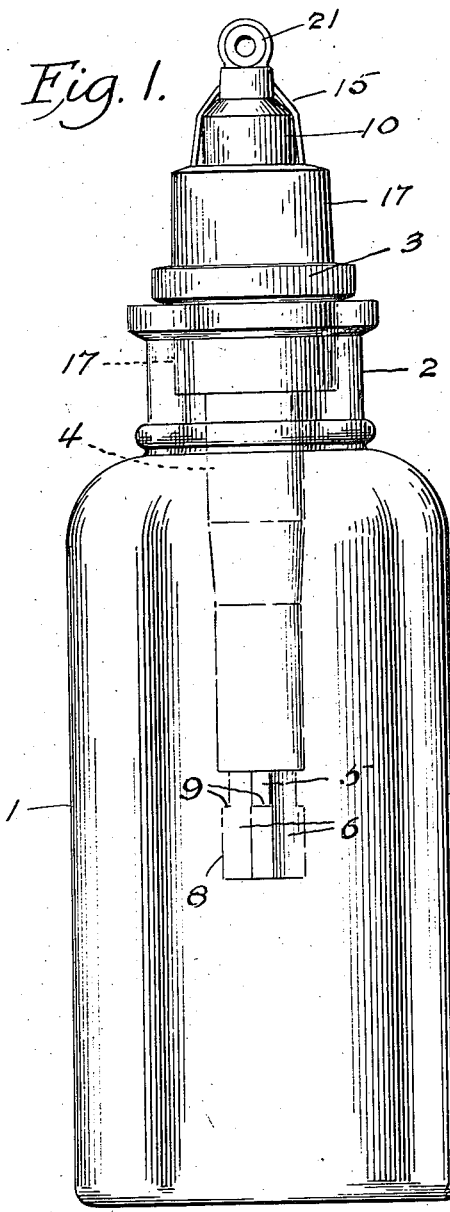
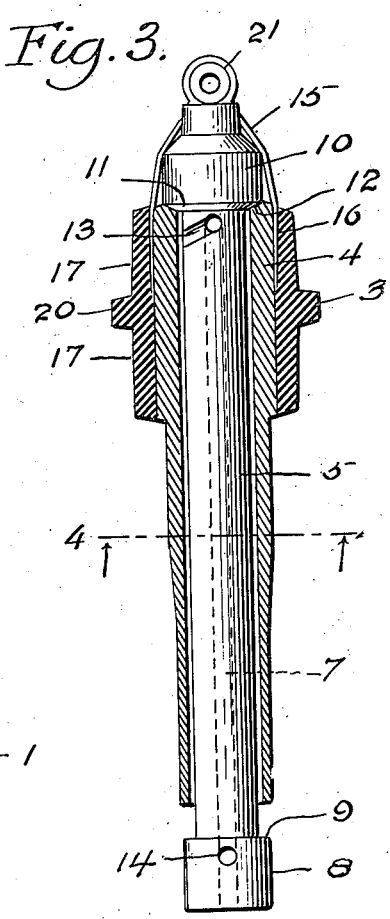
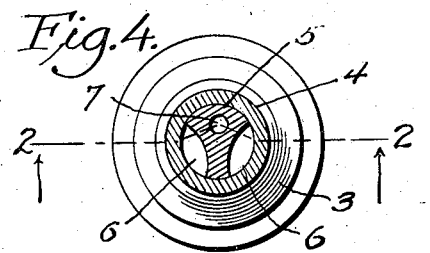
Inventor
Douglas C. Sowell,
By Wm F. Kayle, Attorney July 12, 1927. 1,635,444

D. C. SOWELL

LIQUID BATTERY FILLING DEVICE

Filed June 12, 1926    2 Sheets-Sheet 2

Inventor

Douglas C. Sowell,

By Wm. F. Doyle, Attorney

Patented July 12, 1927.

1,635,444

UNITED STATES PATENT OFFICE.

DOUGLAS C. SOWELL, OF BALTIMORE, MARYLAND.

LIQUID-BATTERY FILLING DEVICE.

Application filed June 12, 1926. Serial No. 115,650.

This invention relates to an improved liquid filling device for receptacles and more particularly to a device for filling battery cells with electrolyte.

Among the objects are to provide means whereby an amount of liquid may be added to a cell to bring the level of the liquid to a predetermined level above the plates.

Another object being to provide a filler that automatically operates to discharge its contents when inserted into a cell, when the liquid filling of the battery is not up to the proper level.

A further object being to provide a device that will automatically cut off the flow of liquid into the cell, when same has reached a predetermined depth above the plates.

A further object being to provide a filler having the capacity to provide all the water customarily needed to bring the level of the water in the cell to the proper level, at a single operation.

A further object being to provide a battery filler that will not deposit part of its contents on the outer surface of the cell on its way to and from its filling position.

These and other objects in view will appear in the following description and be finally pointed out in the annexed specification. Similar numerals indicate corresponding parts in all the figures of the drawings in which:

Fig. 1 is an elevation of my improved battery filler, with its filling tube inverted within the liquid container, in storage or inactive position.

Fig. 3 is a vertical section of the filling tube with the valve closed.

Fig. 4 is a horizontal section on line 4—4 of Fig. 3.

Figure 2:
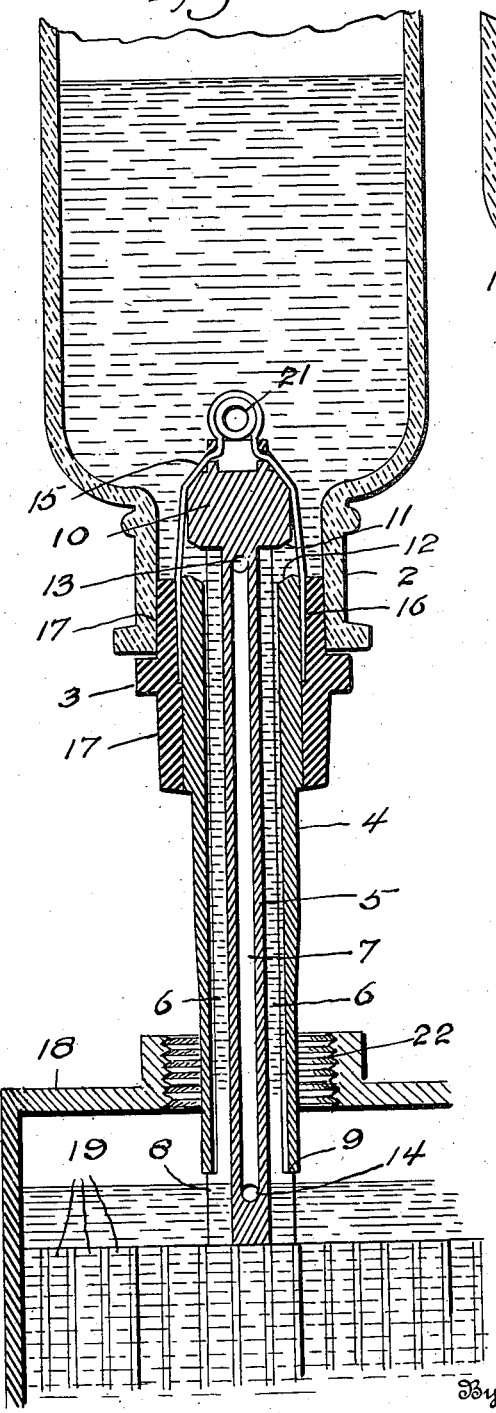
Fig. 2 is a vertical section of the device in battery filling position showing the parts in the position they assume during the filling of the battery, and at the time that the water in the battery has closed the lower end of the air vent and cut off the flow of water to the battery.

Reference now being had to the drawings by numerals.

In battery filling, it very often happens that too much or not enough water is put in a cell. If too much water is put in, it splashes up and out through the vent hole in the cap, it being necessary to have said vent hole in the cap to permit the escape of gas generated in the cell of the battery.

When not enough water is in a cell, the plates are exposed, become dry and deteriorate as is obvious.

This device consists of a container 1 in any preferred sizes adapted to hold the sterilized water used in filling batteries and is preferably of a glass or other substance not subject to action of acid or one in which the water may become polluted. Said receptacle may be of any preferred capacity and form, but for convenience and economy, is preferably a stock bottle having the usual neck tube into which a stopper 3, preferably of rubber, may be inserted.

The cork or stopper of the bottle is provided with an opening in which is firmly mounted one end of the filling tube 4.

Mounted in the tubular member 4, is a slidably mounted valve stem 5, said valve stem being provided with cut-away portions 6 through which the water may pass, an air passage 7 through which air passes up within the container to replace the water as it lifts said container to the battery.

The valve stem is provided at its outer end with enlargement 8 and a shoulder 9, the latter adapted to come into contact with the lower end of the filling tube and arrest the upward movement of the valve stem in the tube. At the inner end of the valve stem is provided an enlargement 10 on which is formed the valve 11 adapted to sit in valve seat 12 arranged at the inner end of the filling tube.

The inner end of the air passage 7 communicates with an outlet passage 13 adjacent to the valve above referred to, which is exposed when the valve is open, as seen in Fig. 2. Said passage 7 is also provided at its outer end with the inlet opening 14 formed in the enlarged head 8 of the stem, said passage 14 being unaffected by the movement of the valve stem, it being beyond the shoulder and normally open.

The stopper 3 above referred to may be formed in such a manner as to snugly fit the neck of the bottle at either end and if necessary may have a central flange 20 to act as a stop for the inward movement of the stopper. Said stopper is preferably made of relatively soft rubber and is slipped over the inner end of the filling tube which it snugly fits and seals the parts when inserted in the bottle neck. Preferably a rubber band 15 is looped over a smooth extension 21 of the stem and extends down over the outer surface of the filling tube in such a position that when the stopper is slipped down over the filling tube it retains the ends of the bands in the position shown at 16 in Fig. 2, said elastic band being unaffected by the action of the water in the container and is also easily replaced should it be broken.

As above stated, the stopper 3 is provided with duplicate ends 17 adapted for reversible entry into the neck of the bottle and as shown in Fig. 2, may be inserted with the filling end of the filling tube projecting over the bottle or be inverted and inserted within the bottle as shown in Fig. 1, with the valve outside to seal the interior of the container against pollution. The ordinary form of battery casing is shown in Fig. 2 having plates 19 and a filling opening 22 through which the improved filler may be inserted and brought into contact at its outer end with the top of the plates.

Figure 5:
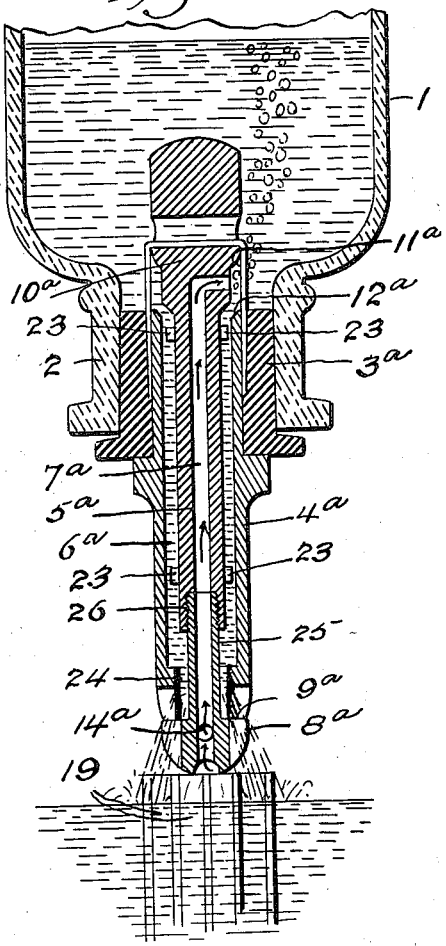
Fig. 5 is a vertical section of a modified form of filling tube having an upper and lower valve.

By reference to Fig. 5 it will be seen that a slight modification is shown wherein, inner and outer valves are provided and consists of the filling tube 4ª of substantially the same construction as shown, in the preferred form. Said modified form is provided with a valve stem 5ª, which is smaller in diameter than the inner area of the filling tube thus providing for a water passage 6ª, said valve stem being provided with lugs 23 to maintain the stem 5ª centrally, within the filling tube.

The valve stem is provided at its inner end with a valve member 11ª and a seat 12ª corresponding with the preferred form as described. The outer end of the valve stem is provided with the enlargement 8ª, shoulder 9ª the latter being adapted to limit the inner movement of the same.

At the outer end of the filling tube is provided a restricted passage for the water as seen at 24 and the outer end of the valve stem is reduced as seen at 25 and is connected by screw threads to the inner portion of the stem as seen at 26. The restricted passage 24 and the outer surface of the valve stem adjacent to the joint between its members correspond and provide an elongated valve or stopper for the passage of water at said point, said elongated valve being provided to cut off the water immediately on lifting the outer end of the valve stem out of contact with the battery plates. Said valve at the outer end of the filling tube cannot be of a construction similar to that at the inner end for the reason that the contact of said valves and their seats cannot be arranged to coincide and operate to cut off the flow of water simultaneously. Therefore the elongated sliding valve at the outer end is provided and is intended to cut off the flow of water from the filler immediately on lifting the filler free from the plates thus avoiding any further discharge of water from the container after it has been once cut off.

The stopper 3ª is a single way stopper but may be of the form shown in the other figures of the drawings.

Operation of the device is as follows: The parts may be retained and the contents of the filler remain in a sterilized condition indefinitely with the parts shown as in Fig. 1. When the filler is to be used the parts are arranged as shown in Fig. 2 and the outer end of the filling tube is inserted through the opening 22 of the battery that must be filled. The enlarged head of the valve stem is brought into contact with the top of the plates and the remainder of the device continues downwardly until the lower end of the filling tube comes into contact with the shoulder 9. During said movement the valve at the upper end of the stem is opened against the tension of the rubber band 15. The level of the water, it must be assumed, is for instance, as shown in Fig. 5, thus placing the inlet opening 14 for air above the level of the liquid in the battery. In this position the water from the container flows freely down through passages 6 and air flows freely upward through passages 7 and bubbles out through to the upper portion of the container to fill the space vacated by the water, said flow of water continuing until the level of the water in the battery cell reaches the upper edge of the opening 14 which cuts off the flow of air up through passage 7 and of the container which immediately stops the flow of water over the container. The level at which the water is cut off may be regulated by the location of passage 14 but is ordinarily placed approximately ¼ of an inch above the outer end of the valve stem. When the operator lifts the filler from its position, the flexible band 15 operates to close the valve, said operation being aided by the pressure of the water in the container, and the flow of water from the filling tube is cut off and the container may be withdrawn from the battery opening in which it was inserted and moved to the next one and the operation repeated.

In ordinary practice with batteries such as those used in automobiles the preferred form of filler would be entirely satisfactory for the reason that the few remaining drops of water left in the passage 6 which is between the valve stem and filling tube, would not seriously affect the level of water in the cell after the valve has been closed, but where the cells are very small and there is considerable variety of sizes wherein a small amount of water, more or less, is a serious matter, the form shown in Fig. 5 was thought necessary in which construction the water is cut off immediately, there being no continuation of flow represented in the contents of the tube after the valve is closed and for this reason the lower or outer valve is provided and the level of water above the plates accurately gauged by the location of the air inlet passage 14ª, such a device being especially adapted for use in small batteries such as used in radio work.

Having described my invention, what I claim and desire to secure by Letters Patent is:

1. A liquid filler for receptacles comprising in combination, a container, a filling tube leading from the container, a valve at the inner end of the tube, a valve stem extending through the tube adapted when the filler is inverted, to come into contact with an object to open the valve and close and protect the outer end of the tube, and means at the outer end of the tube for controlling the flow of liquid through the tube.

2. A liquid filler for receptacles comprising in combination, a container, a filling tube leading from the container, a valve at the inner end of the tube, a valve stem extending beyond the opposite end of the tube and adapted when the filler is inverted to be brought into contact with a part of the receptacle to open the valve and close and protect the outer end of the tube, and means at the outer end of the tube for controlling the flow of liquid through the tube.

3. A liquid filler for receptacles comprising in combination, a container, a filling tube leading from the container, a valve for closing the inner end of the tube when the container is inverted, means for opening said valve and closing and protecting the outer end of the tube at the outer end of the tube, passages for the liquid at the outer end of the tube so located as to be covered by the liquid in the receptacle when it has reached the desired level and prevent the flow of liquid through the tube.

DOUGLAS C. SOWELL.